US012775357B2

(12) United States Patent
Khan et al.

(10) Patent No.: US 12,775,357 B2
(45) Date of Patent: Oct. 27, 2026

(54) SYSTEMS, APPARATUSES, METHODS, AND COMPUTER PROGRAM PRODUCTS WITH ADAPTIVE POWER MANAGEMENT FOR MOTION STABILIZED TOUCH CONTROL

(71) Applicant: Honeywell International Inc., Charlotte, NC (US)

(72) Inventors: Kalimulla Khan, Bangalore (IN); Kenneth Leiphon, Phoenix, AZ (US); Kirupakar J, Madurai (IN); Ramkumar Rajendran, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 19/347,153

(22) Filed: Oct. 1, 2025

(65) Prior Publication Data

US 2026/0029878 A1 Jan. 29, 2026

Related U.S. Application Data

(63) Continuation-in-part of application No. 18/922,076, filed on Oct. 21, 2024, now Pat. No. 12,493,382.
(Continued)

(30) Foreign Application Priority Data

Jul. 31, 2024 (IN) ............................ 202411057949

(51) Int. Cl.
*G06F 3/041* (2006.01)
*G06F 3/04886* (2022.01)

(52) U.S. Cl.
CPC ...... *G06F 3/04186* (2019.05); *G06F 3/04886* (2013.01)

(58) Field of Classification Search
CPC ......................... G06F 3/04186; G06F 3/04886
See application file for complete search history.

(56) References Cited

U.S. PATENT DOCUMENTS

| | | | |
|---|---|---|---|
| 8,631,358 | B2 | 1/2014 | Louch |
| 8,902,100 | B1 | 12/2014 | Woodell et al. |

(Continued)

FOREIGN PATENT DOCUMENTS

| | | | |
|---|---|---|---|
| EP | 1207072 | A1 | 5/2002 |
| EP | 3715165 | A1 | 9/2020 |

(Continued)

OTHER PUBLICATIONS

CN Office Action Mailed on Aug. 5, 2025 for CN Application No. 202510979711, 1 page(s).

(Continued)

*Primary Examiner* — Michael Pervan
(74) *Attorney, Agent, or Firm* — Alston & Bird LLP

(57) ABSTRACT

Embodiments of the present disclosure relate to systems and methods for motion stabilized touch control with adaptive power management. A motion stabilization model is used to generate reference data comprising stabilized positions for touch points associated with a touch screen device, based on motion data from inertial measurement units. Touch zones are adjusted according to these stabilized positions through computer-executable instructions. The system monitors device activity using motion data and identifies computational resources to be allocated based on the activity state. Touch detection models are updated using these resources to learn the stabilized positions. Additionally, the system adjusts the refresh rate of the touch screen device in response to user interactions and recalibrates the dimensions of touch zones based on the adjusted refresh rate, thereby enhancing responsiveness and power efficiency.

20 Claims, 6 Drawing Sheets

Related U.S. Application Data

(60) Provisional application No. 63/593,860, filed on Oct. 27, 2023.

(56) References Cited

U.S. PATENT DOCUMENTS

| | | | |
|---|---|---|---|
| 9,268,479 | B2 | 2/2016 | Stedman et al. |
| 9,323,452 | B2 | 4/2016 | Kuscher et al. |
| 9,645,653 | B2 | 5/2017 | Louch |
| 9,870,093 | B2 | 1/2018 | Gannon |
| 9,904,360 | B2 | 2/2018 | Hennelly et al. |
| 9,990,003 | B2 | 6/2018 | Bailey |
| 10,133,459 | B2 | 11/2018 | Andreasson et al. |
| 10,370,122 | B2 | 8/2019 | Fisher et al. |
| 10,564,714 | B2 | 2/2020 | Marggraff et al. |
| 11,243,637 | B2 | 2/2022 | Louch |
| 11,726,340 | B1 | 8/2023 | Suddreth et al. |
| 12,617,417 | B2 | 5/2026 | Alexander et al. |
| 2008/0055259 | A1 | 3/2008 | Plocher |
| 2009/0100384 | A1 | 4/2009 | Louch |
| 2011/0126119 | A1 | 5/2011 | Young et al. |
| 2011/0187651 | A1 | 8/2011 | Whitlow et al. |
| 2011/0234799 | A1 | 9/2011 | Mueller |
| 2012/0127115 | A1 | 5/2012 | Gannon |
| 2012/0188170 | A1 | 7/2012 | Stedman et al. |
| 2012/0306768 | A1 | 12/2012 | Bailey |
| 2013/0234929 | A1 | 9/2013 | Libin |
| 2014/0043241 | A1 | 2/2014 | Sukumar |
| 2014/0129994 | A1 | 5/2014 | Louch |
| 2014/0354515 | A1 | 12/2014 | Lavalle et al. |
| 2015/0002403 | A1 | 1/2015 | Dostal et al. |
| 2015/0015508 | A1 | 1/2015 | Song et al. |
| 2015/0029218 | A1 | 1/2015 | Williams et al. |
| 2015/0193006 | A1 | 7/2015 | Nasiri et al. |
| 2015/0279102 | A1 | 10/2015 | Fleck et al. |
| 2016/0187879 | A1 | 6/2016 | Mere et al. |
| 2016/0283015 | A1 | 9/2016 | Zaitsev et al. |
| 2017/0006931 | A1 | 1/2017 | Guez et al. |
| 2017/0041545 | A1 | 2/2017 | Murgia et al. |
| 2017/0123215 | A1 | 5/2017 | Li et al. |
| 2017/0153802 | A1 | 6/2017 | Ali et al. |
| 2017/0228032 | A1 | 8/2017 | Louch |
| 2017/0228095 | A1 | 8/2017 | Domaradzki et al. |
| 2017/0312614 | A1 | 11/2017 | Tran et al. |
| 2017/0352129 | A1 | 12/2017 | Fu et al. |
| 2018/0024661 | A1 | 1/2018 | Lin et al. |
| 2018/0046870 | A1 | 2/2018 | Cordell et al. |
| 2018/0081614 | A1 | 3/2018 | Tsai et al. |
| 2018/0157045 | A1 | 6/2018 | Davami |
| 2019/0283672 | A1 | 9/2019 | Daman |
| 2019/0302883 | A1 | 10/2019 | Greer et al. |
| 2019/0318711 | A1 | 10/2019 | Chavez et al. |
| 2019/0378475 | A1 | 12/2019 | Lim et al. |
| 2019/0384480 | A1 | 12/2019 | Lee et al. |
| 2020/0089366 | A1 | 3/2020 | Lin et al. |
| 2021/0110795 | A1 | 4/2021 | Burkhard et al. |
| 2021/0174767 | A1 | 6/2021 | Edgren et al. |
| 2021/0225055 | A1 | 7/2021 | Choi et al. |
| 2021/0262800 | A1 | 8/2021 | Levine et al. |
| 2021/0263586 | A1 | 8/2021 | Wang |
| 2022/0397975 | A1 | 12/2022 | Iliffe-Moon |
| 2023/0062433 | A1 | 3/2023 | Judi et al. |
| 2023/0098727 | A1 | 3/2023 | Sahebnassagh et al. |
| 2023/0274386 | A1 | 8/2023 | Herman et al. |
| 2025/0004683 | A1 | 1/2025 | Di et al. |
| 2025/0138675 | A1 | 5/2025 | Khan et al. |

FOREIGN PATENT DOCUMENTS

| | | | |
|---|---|---|---|
| GB | 2614296 | A | 7/2023 |
| KR | 10-2018-0083073 | A | 7/2018 |

OTHER PUBLICATIONS

English Translation of CN Office Action dated Aug. 5, 2025 for CN Application No. 202510979711, 1 page(s).

Extended European Search Report Mailed on Dec. 2, 2025 for EP Application No. 25190030, 8 page(s).

Extended European Search Report Mailed on Dec. 8, 2025 for EP Application No. 25187673, 8 page(s).

Extended European Search Report Mailed on Dec. 9, 2025 for EP Application No. 25187671, 7 page(s).

Extended European Search Report Mailed on Dec. 11, 2025 for EP Application No. 25187657, 7 page(s).

Extended European Search Report Mailed on Dec. 11, 2025 for EP Application No. 25188539, 9 page(s).

Extended European Search Report Mailed on Dec. 16, 2025 for EP Application No. 25188538, 9 page(s).

Extended European Search Report Mailed on Dec. 19, 2025 for EP Application No. 25188541, 8 page(s).

Extended European Search Report Mailed on Nov. 19, 2025 for EP Application No. 25187666, 8 page(s).

Extended European Search Report Mailed on Nov. 25, 2025 for EP Application No. 25189254, 8 page(s).

Final Rejection Mailed on Feb. 27, 2026 for U.S. Appl. No. 18/922,093, 12 page(s).

Murakami et al., "Gaze from Head: Gaze Estimation Without Observing Eye ", Lecture Notes in Computer Science, Springer, Feb. 23, 2020, pp. 254-267.

Non-Final Rejection Mailed on Apr. 8, 2026 for U.S. Appl. No. 18/921,899, 15 page(s).

Non-Final Rejection Mailed on Sep. 26, 2025 for U.S. Appl. No. 18/922,093, 11 page(s).

Notice of Allowance and Fees Due (PTOL-85) Mailed on Jul. 1, 2025 for U.S. Appl. No. 18/922,076, 8 page (s).

Outgoing—ISA/210—International Search Report Mailed on Feb. 12, 2026 for WO Application No. PCT/US25/048789, 4 page(s).

Outgoing—ISA/210—International Search Report Mailed on Jan. 23, 2026 for WO Application No. PCT/US25/048796, 4 page(s).

Outgoing—ISA/210—International Search Report Mailed on Jan. 27, 2026 for WO Application No. PCT/US25/048793, 4 page(s).

Outgoing Written Opinion of the ISA Mailed on Feb. 12, 2026 for WO Application No. PCT/US25/048789, 4 page(s).

Outgoing Written Opinion of the ISA Mailed on Jan. 23, 2026 for WO Application No. PCT/US25/048796, 4 page(s).

Outgoing Written Opinion of the ISA Mailed on Jan. 27, 2026 for WO Application No. PCT/US25/048793, 4 page(s).

Ritu Singh, Apple Fans Are Already Returning Their Vision Pro Headsets. Here's Why, Feb. 15, 2024, https://www.ndtv.com/feature/apple-fans-are-already-returning-their-vision-pro-headsets-heres-why-5065151, Jan. 3, 2025.

Notice of Allowance and Fees Due (PTOL-85) Mailed on May 5, 2026 for U.S. Appl. No. 18/922,093, 9 page(s).

Outgoing—ISA/210—International Search Report Mailed on May 19, 2026 for WO Application No. PCT/US25/048802, 3 page(s).

Outgoing Written Opinion of the ISA Mailed on May 19, 2026 for WO Application No. PCT/US25/048802, 4 page(s).

Non-Final Rejection Mailed on Aug. 12, 2026 for U.S. Appl. No. 18/921,887, 9 page(s).

Non-Final Rejection Mailed on Aug. 26, 2026 for U.S. Appl. No. 18/921,880, 6 page(s).

Non-Final Rejection Mailed on Aug. 26, 2026 for U.S. Appl. No. 18/921,908, 9 page(s).

Notice of Allowance and Fees Due (PTOL-85) Mailed on Aug. 21, 2026 for U.S. Appl. No. 18/922,093, 8 page(s).

SYSTEMS, APPARATUSES, METHODS, AND COMPUTER PROGRAM PRODUCTS WITH ADAPTIVE POWER MANAGEMENT FOR MOTION STABILIZED TOUCH CONTROL

CROSS-REFERENCE TO RELATED APPLICATIONS

This application is a continuation-in-part application under 35 U.S.C. § 120 of U.S. patent application Ser. No. 18/922,076 filed on Oct. 21, 2024, which claims the benefit of U.S. Provisional Patent Application No. 63/593,860, filed Oct. 27, 2023 and India Provisional Patent Application No. 202411057949, filed Jul. 31, 2024, the entire contents of which are incorporated by reference herein.

TECHNOLOGICAL FIELD

The present disclosure is generally directed to motion stabilization. Example embodiments are directed to systems, apparatuses, method, and computer program products for motion stabilized touch control.

BACKGROUND

Various embodiments of the present disclosure address technical challenges related to touch control. Through applied effort, ingenuity, and innovation, Applicant has solved problems related to touch control, including motion stabilization in touch controls, by developing solutions embodied in the present disclosure, which are described in detail below.

BRIEF SUMMARY

In general, embodiments of the present disclosure provide methods, apparatus, systems, computer program products, and/or the like for advanced motion stabilized touch control.

In accordance with one aspect of the present disclosure a computer-implemented method for advanced motion stabilized touch control is provided. The computer-implemented method is executable utilizing any of a myriad of computing device(s) and/or combinations of hardware, software, and/or firmware. In some example embodiments, an example computer-implemented method comprises determining, using a motion stabilization model, stabilized positions for one or more touch points corresponding to one or more touch zones associated with a touch screen device; adjusting the one or more touch zones based on the stabilized positions; reprocessing touch detection logic associated with the touch screen device; normalizing, using the motion stabilization model, the one or more touch zones; and integrating the position stabilized and normalized one or more touch zones into a scene rendering process.

In some embodiments, determining the stabilized positions for the one or more touch zones comprise identifying stable positions and establishing the stabilized positions as reference points for adjusting the one or more touch zones.

In some embodiments, adjusting the one or more touch zones comprises aligning the one or more touch zones with the stabilized positions.

In some embodiments, reprocessing the touch detection logic comprises updating one or more touch detection algorithms.

In some embodiments, normalizing the one or more touch zones comprises recalibrating dimensions of the one or more touch zones by adjusting the size and shape of each touch zone; and standardizing the locations of the touch zone.

In some embodiments, integrating the position stabilized and normalized one or more touch zones into the scene rendering process comprises updating graphical representation of the one or more touch zones within a user interface.

In some embodiments, the computer-implemented method, further comprises causing performance of display processing.

In accordance with another aspect of the present disclosure, an apparatus for advanced motion stabilized touch control is provided. The apparatus in some embodiments includes at least one processor and at least one memory storing instructions that, when executed by the at least one processor, cause the apparatus to perform any of the example computer-implemented methods described herein. In some other embodiments, the apparatus includes means for performing each step of any of the computer-implemented methods described herein.

In accordance with another aspect of the present disclosure, a computer program product for advanced motion stabilized touch control is provided. The computer program product in some embodiments includes one or more non-transitory computer-readable storage media including instructions that, when executed by one or more processors, cause the one or more processors to perform any one or the example computer-implemented methods described herein.

BRIEF DESCRIPTION OF THE DRAWINGS

Figure 1:
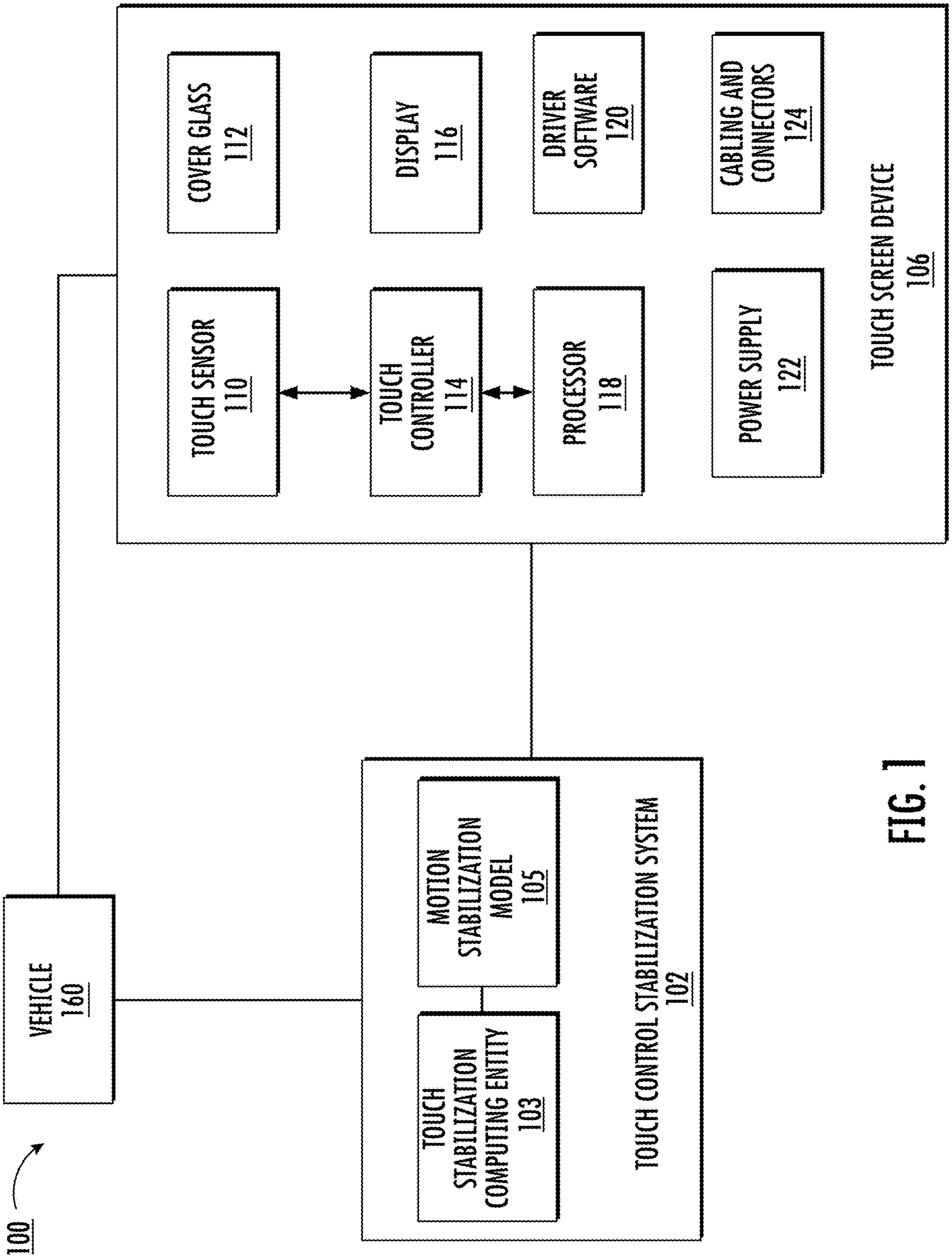

Having thus described the embodiments of the disclosure in general terms, reference now will be made to the accompanying drawings, which are not necessarily drawn to scale, and wherein:

FIG. 1 provides an example overview of an architecture in accordance with at least some embodiments of the present disclosure.

Figure 2:
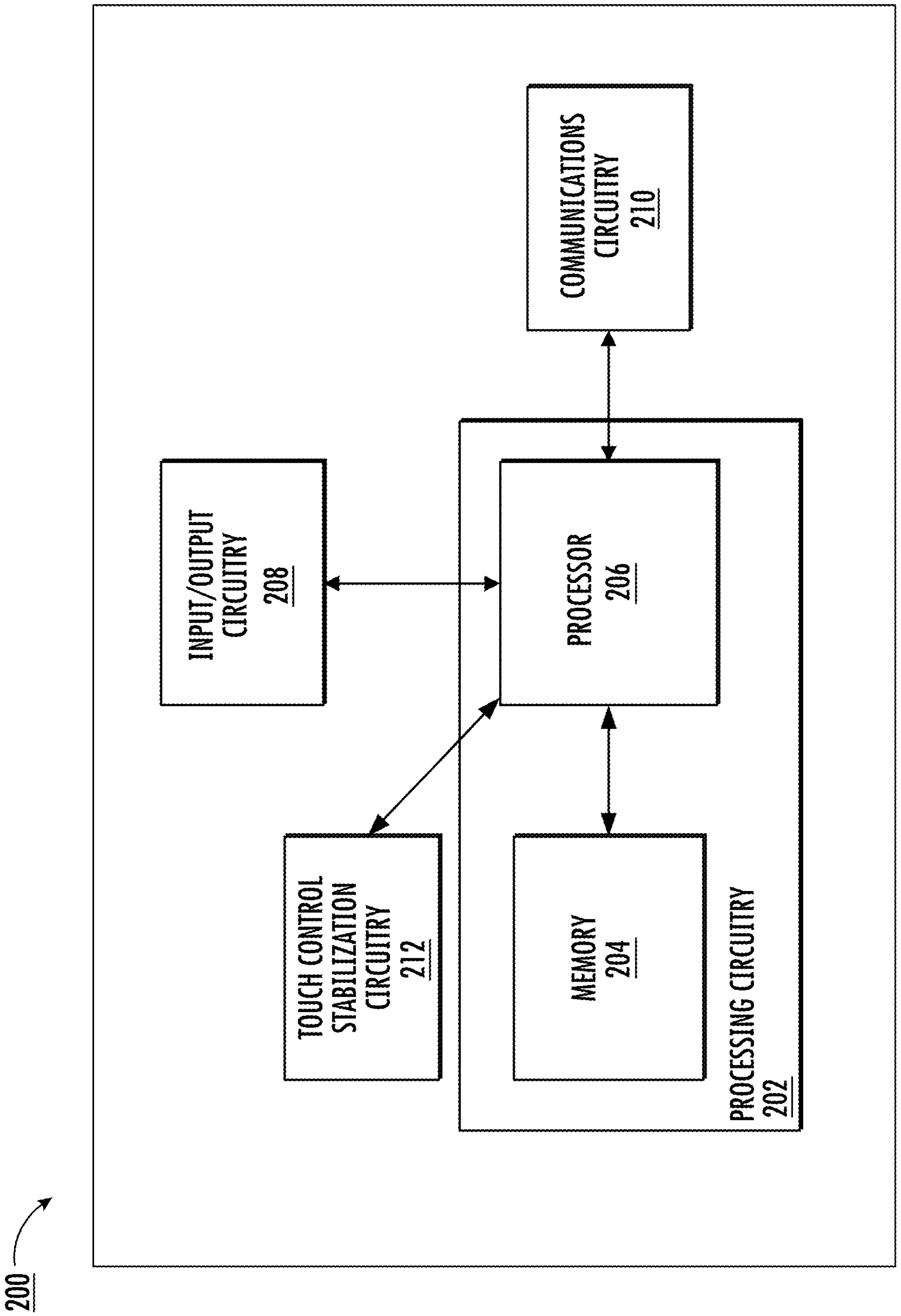

FIG. 2 provides an example apparatus in accordance with at least some embodiments of the present disclosure.

Figure 3:
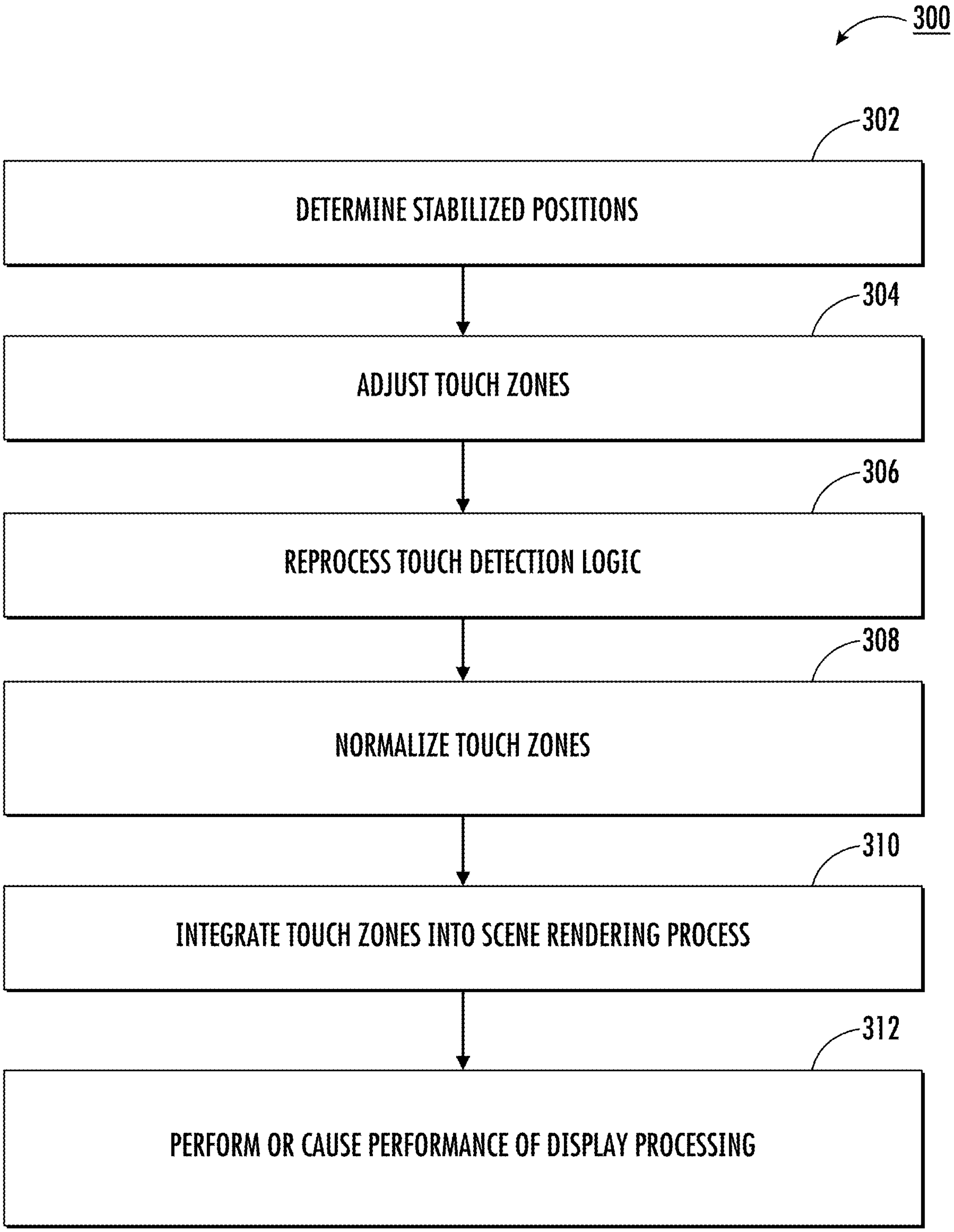

FIG. 3 is a flowchart diagram of an example process for touch control motion stabilization in accordance with at least some embodiments of the present disclosure.

Figure 3A:
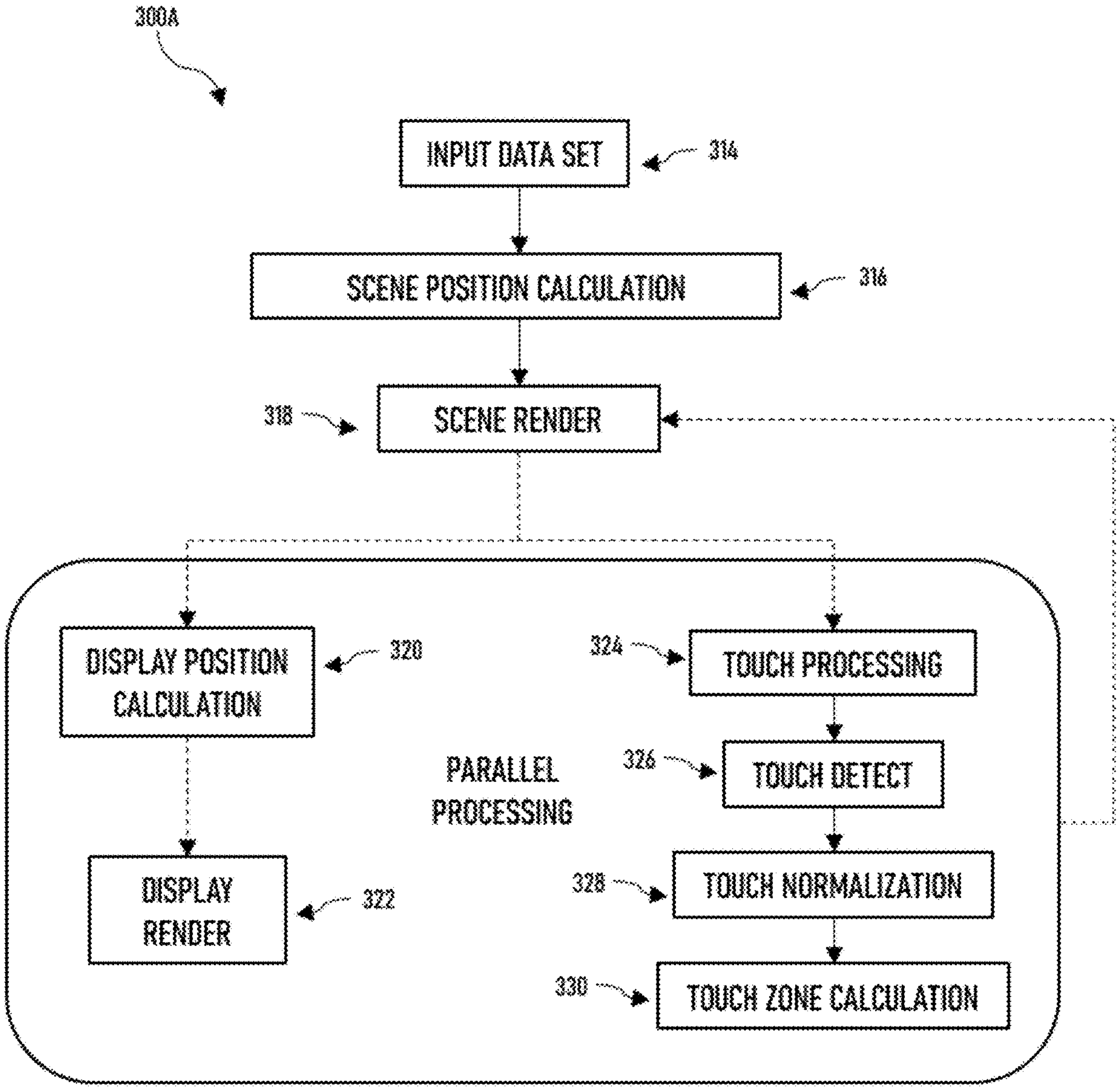

FIG. 3A illustrates an example flow chart depicting operations for parallel processing of the display render stage and the touch zone calculation stage in accordance with at least some embodiments of the present disclosure.

Figure 4:
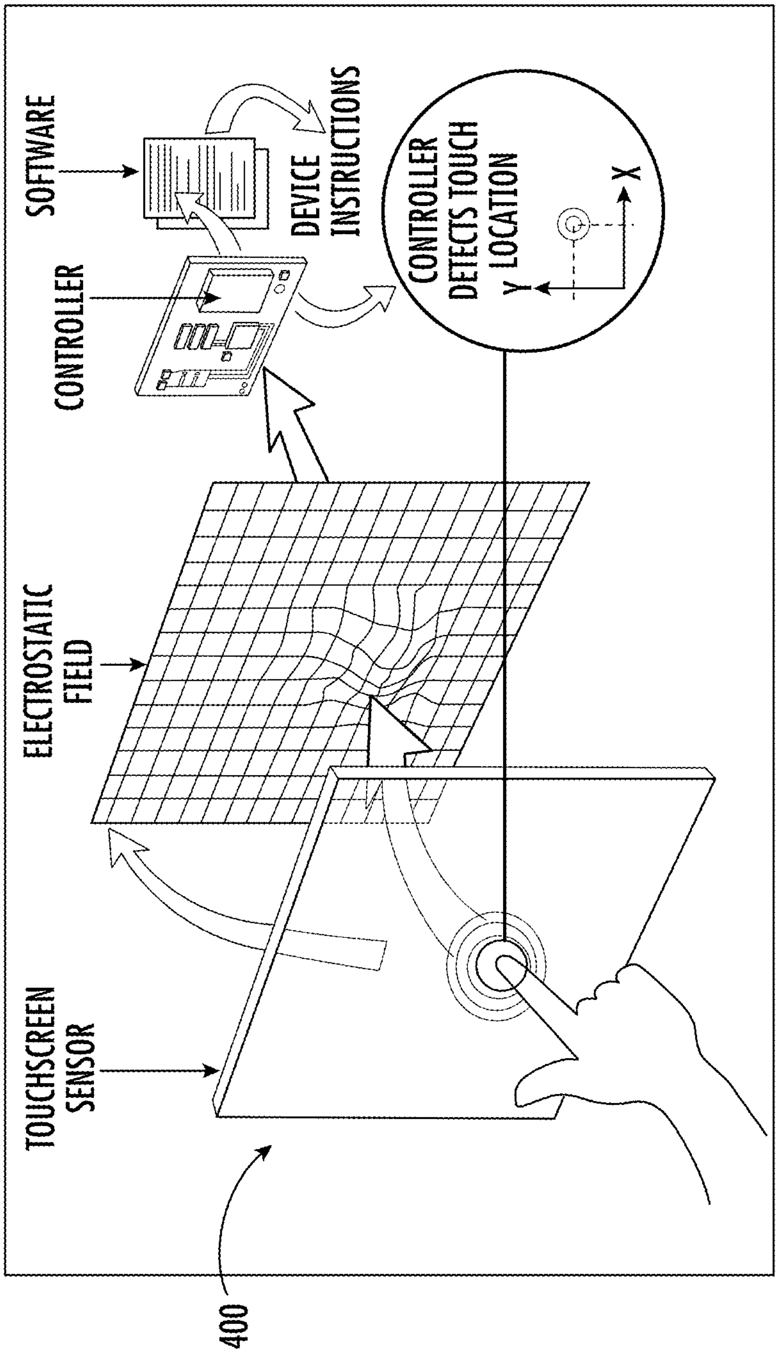

FIG. 4 illustrates an operation example of touchscreen sensor 400 and associated environment in accordance with at least some embodiments of the present disclosure.

Figure 5A:
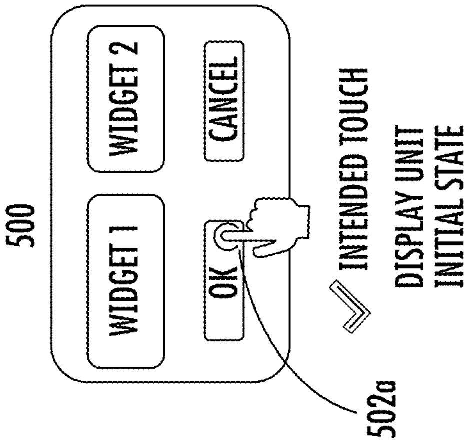
Figure 5B:
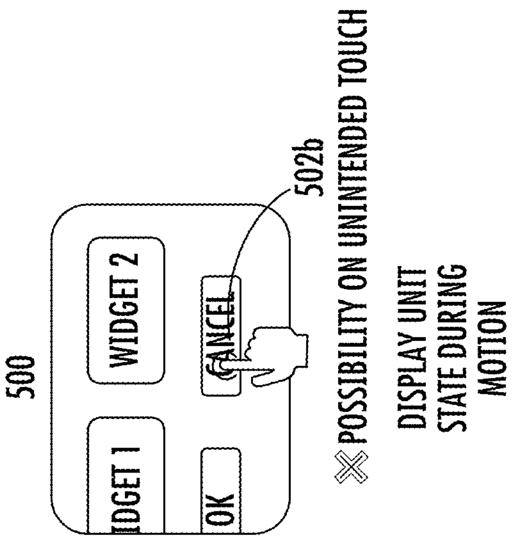

FIGS. 5A and 5B each illustrate operational examples of user interaction with a touch screen in accordance with at least some embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Example embodiments disclosed herein address technical challenges associated with motion stabilization in touch screen device. Touch screen on portable devices or mounted displays can encounter several issues during motion. Inaccuracy becomes a significant problem as the touch input may not register correctly, making precise interaction difficult. Latency, or the delay between touch input and display response, can be exacerbated by motion, leading to a less responsive experience. Additionally, motion can cause touch points (e.g., touch widgets, touch zones) to jitter, resulting in unstable and erratic touch input. Unintended touches are more likely during motion, leading to accidental actions on the display Touch screen displays in cockpits and automobiles face several specific issues during motion. In these environments, inaccuracy becomes a critical problem as precise touch input is often necessary for operating navigation systems and controlling various functions. Unintended touches are more likely due to the movement of the vehicle or aircraft, which can result in accidental and potentially dangerous actions. When using a touchscreen during motion, several problems can arise, including, but not limited to, reduced accuracy (e.g., difficulty in accurately targeting touch points (e.g., touch widgets, touch zones) due to the movement of the vehicle or user), unintentional inputs (e.g., increased likelihood of accidental touches due to bumps or jolts), inconsistent pressure (e.g., varying pressure applied on the screen, leading to inconsistent touch recognition), delayed response (e.g., motion can cause users to apply less consistent touch, resulting in delays or failure to register inputs), hand stability (e.g., maintaining a stable hand position is challenging, affecting the ability to perform precise actions), user interface (UI) design limitations (e.g., user interfaces not optimized for use in motion may have small touch targets and closely spaced elements, exacerbating accuracy issues), users accidentally touching multiple elements or the wrong element due, for example, finger size, latency (e.g., in motion, any latency in touch response can be more noticeable and disruptive).

Embodiments of the present disclosure provides systems, apparatuses, methods, and computer program products for stabilizing touch controls on a display system that eliminates incorrect and unintended touches in high motion environments. Example embodiments of the present disclosure disclose various techniques including, but not limited to, touch screen sensitivity improvement techniques, advanced algorithms for touch input filtering, and hardware enhancement techniques to ensure reliable performance under motion conditions. Some example embodiments leverage adaptive artificial intelligent (AI) for use mode, touch prediction, and facial tracking. Some example embodiments utilize low processing power (e.g., very low CPU usage). Some example embodiments, leverage existing accelerometers, gyroscopes, and cameras within a smart device.

Some embodiments sense the motion on the screen and render an image that is an inverse of the sensed image such that when displayed on the moving screen, the image is space stabilized to prevent motion and retina blur associated with the moving screen. Some embodiments, re-map the touch zones on the screen based on the sensed motion on the screen, such that the touch zones are space stabilized as well.

Accordingly, example embodiments improve user experience and ensure safety when using devices while on the move or otherwise experiencing relative motion with respect to a device. Embodiments of the present disclosure may be used in a variety of domains and applications including, but not limited to, consumer electronics, military products, exercise equipment, automotive and more. Embodiments of the present disclosure improves usability for the aged or people with disabilities.

Definitions

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively, or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

As used herein, the terms "application," "software application," "app," "computer program," "service," or similar terms refer to a computer program or group of computer programs designed to perform coordinated functions, tasks, or activities. Such computer programs may be operated by or for the benefit of a user or group of users. An application may be configured to provide access to one or more services provided by an entity. For example, an application may be configured to provide access to services provided by visual media content provider systems. An application may run on a server or group of servers, such as, but not limited to, web servers and application servers. In some embodiments, an application may be run on or across one or more other computing devices (e.g., user devices). For example, an application may be configured to be accessed via a web browser, a dedicated client running on a user device, and/or the like. In some examples, an application may be configured for use by and interaction with one or more local, networked or remote computing devices.

As used herein, the term "user device" refers a physical electronic device that may be used by a user for any of a variety of purposes including, but not limited to, one or more of sending and/or receiving signals, storing data, displaying data, viewing media content, extracting content data objects, generating relevance data objects, viewing relevance data objects, and/or generating, sending, and/or receiving segment selection indications. For example, the user device may be capable of, but not limited to, displaying media content. A user device may include a display.

As used herein, the term "display" (noun) refers to a visual output component of certain user devices that may be used to visually display content including, but not limited to visual media content, a captured image or other portion of visual media content, and/or an application (e.g., visual media content application or related application, including web pages and the like). In some embodiments, "displaying" or "display" (verb, gerund, etc.) may refer to the action performed by such displays.

System Architecture

Embodiments of the present disclosure may be implemented in various ways, including as computer program products that comprise articles of manufacture, as hardware, including circuitry, configured to perform one or more functions, and/or as combinations of specific hardware and computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as one or more methods, apparatuses, systems, computing devices (e.g., user devices, servers, etc.), computing entities, and/or the like. As such, embodiments of the present disclosure may take the form of an apparatus, system, computing device, computing entity, and/or the like executing instructions stored on one or more computer-readable storage mediums (e.g., via the aforementioned software components and computer program products) to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, and other example visualizations. It should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. In embodiments in which specific hardware is described, it is understood that such specific hardware is one example embodiment and may work in conjunction with one or more apparatuses or as a single apparatus or combination of a smaller number of apparatuses consistent with the foregoing according to the various examples described herein. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein.

It will be understood that while many of the aspects and components presented in FIG. 1 are shown as discrete, separate elements, other configurations may be used in connection with the methods, apparatuses, computer readable media, and computer programs described herein, including configurations that combine, omit, separate, and/or add aspects and/or components. For example, in some embodiments, the functions of one or more of the illustrated components in FIG. 1 may be performed by a single computing device or by multiple computing devices, which devices may be local or cloud based.

As shown in FIG. 1, the example system environment 100 includes a touch control stabilization system 102 in communication with a touch screen device 106. In some embodiments, the one or more components of the system environment 100 is associated with and/or embodied by a vehicle 160 (and/or associated vehicle system). For example, one or more of the touch control stabilization system 102 or touch screen device 106. In various embodiments, the vehicle may be an aircraft such as a fixed wing aircraft, a commercial or military jet aircraft, a drone, a rotorcraft, helicopter, spacecraft, and other aerial vehicles. In various embodiments, the vehicle may be a land vehicle such as an automobile, truck, SUV, motorcycle, tank, or other civilian or military land vehicle. In some embodiments, the vehicle may be a watercraft such as a boat, ship, yacht, cruiser, battleship, or other civilian or military watercraft. In various embodiments, the present systems and methods may be applicable to various vehicle types, including those of manned, unmanned, autonomous, and/or internet-connected vehicles. In various embodiments, the vehicle may be a treadmill. It would be appreciated that in various embodiments, the vehicle can be any type of vehicle. In some embodiments, a vehicle may refer to any device and/or system that can cause a user associated with the device and/or system to experience motion and/or relative motion with respect to a touch screen device (and/or other device).

In some embodiments, a touch screen device is a physical electronic device that includes a touch screen display and that may be used by a user for any of a variety of purposes including, but not limited to, displaying media content containing one or more images. A touch screen device, for example, may be a user device with a touch screen display. In some embodiments, such "display" (noun) included in a display device is a visual output component of the display device that may be used to visually display content including, but not limited to visual media content, a captured image or other portion of visual media content, and/or an application (e.g., visual media content application or related application, including web pages and the like). In some embodiments, "displaying" or "display" (verb, gerund, etc.) may refer to the action performed by such touch screen displays. In this regard, the touch screen device 106 may be any device having a touch screen display. Non-limiting examples of touch screen device 106 include tablet computers, laptop computers, smart phones, notepads, vehicle infotainment systems (e.g., car infotainments system, and/or the like), aircrafts display units, and/or the like. The touch screen device 106 may include touch sensor 110, a touch controller 114, a display 116, a processor 118, a driver software 120. In various embodiments, the touch sensor 110 is a layer of the touch screen device 106 configured to interact with the user's touch. Non-limiting examples of a touch sensor 110 include resistive touch sensors, capacitive touch sensors, surface acoustic wave (SAW) sensors and infrared sensors. A resistive touch sensor may comprise one or more layers. In some examples, the one or more layers include at least two thin, electrically conductive layers that are spaced apart (e.g., separated by a thin gap/space). These two thin layers (and/or other layers) come in contact when a user touches the screen (e.g., touch screen) and causes the electrical resistance to change. A capacitive touch sensor may be configured to use the electrical properties of the human body to change the local electrostatic field when touched. The capacitive sensor may comprise a glass layer coated with a transparent conductor. A surface acoustic wave touch sensor may be configured to use ultrasonic waves that pass over the touch screen. When the screen is touched, a portion of the ultrasonic waves is absorbed, and the change is detected. An infrared touch sensor may be configured to utilize a grid of infrared light beams across the screen surface. Touching the screen causes the infrared light beams to be interrupted. The location of the touch may then be calculated based on the interrupted light beams.

In various embodiments, the touch controller 114 is configured to receive signals from the touch sensor 110 and process the to determine the location (e.g., exact location) of a user's touch, type of touch, and intensity of the touch. The touch controller interfaces with the touch sensor 110 and converts the analog touch data/signals into digital signals.

In various embodiments, the display 116 comprise a visual output layer of the touch screen device. Non-limiting examples of a display 116 include Liquid Crystal Display (LCD) (e.g., which may be configured to use liquid crystals and a backlight to produce images), Organic Light Emitting Diode (OLED) (e.g., which may be configured to use organic compounds that emit light when an electric current is applied), Light Emitting Diode (LED) (which may be configured to use LED backlighting for improved brightness and color range).

In various embodiments, the processor 118 is configured to run the software(s) and/or application(s) on the touch screen device 106. The processor 118 may be configured to receive input from the touch controller 114 and performs one or more functionalities associated with the touch screen device. In various embodiments, the driver software 120 is configured to translate touch inputs into actions on the display. The driver software 120 may be configured to ensure that the system correctly interprets gestures, taps, and/or swipes.

In various embodiments the touch screen device 106 further includes a cover glass 112, power supply 122, and/or cabling and connectors 124. In various embodiments, the cover glass 112 is a protective layer on top of the touch sensor 110 and may be made of durable materials to, for example, protect against scratches and impacts. One non-limiting example of such cover glass is a gorilla glass. The power supply 122 is configured to provide electrical power to components of the touch screen device 106. The cabling and connectors 124 may connect two or more components of the touch screen device 106 and/or connect one or more components of the touch screen device 106 to external devices and/or such systems to, for example, ensure seamless communication and power delivery.

In various embodiments, the touch control stabilization system 102 is configured to improve the legibility of a moving screen by appropriately positioning the touch points/widgets in synchronization (e.g., in sync) with a user's gaze. In various embodiments, the touch control stabilization system 102 is configured to sense the motion of the screen and render new positions for the touch controls which may be an inverse of the sensed motion. The touch control stabilization system 102 is configured to display the touch points on the screen (e.g., moving screen) such that the touch points are space stabilized to prevent motion and retina blur associated moving screens (e.g., moving electronic screens or the like).

The touch control stabilization system 102 may include touch control stabilization computing entity 103 and a motion stabilization model 105 defining or otherwise comprising a motion stabilization algorithm. Additionally, the touch control stabilization system 102 may include a power optimization model (not shown) defining or otherwise comprising a dynamic resource allocation algorithm and a refresh rate control algorithm. In various embodiments, the motion stabilization model 105 (e.g., motion stabilization algorithm thereof) is configured to receive an input data set. Also, in various embodiments, the power optimization model (e.g., dynamic resource allocation algorithm and refresh rate control algorithm thereof) is configured to receive the input data set as well. The input data set may comprise input data from one or more vehicle inertial measurement unit (IMU) sensors, input data from one or more display IMU sensors, input data from one or more cameras, calculated eye gaze estimation parameters, input data from video and/or lidar sensors, and/or current graphical user interface (GUI) overlay. In various embodiments, the touch control stabilization computing entity 103 may receive the input dataset from the touch control stabilization computing entity 103. For example, the touch control stabilization computing entity 103 may be in communication with the vehicle 160, vehicle IMU sensor(s), display IMU sensor(s) (associated with the touch screen device), camera(s), and/or video (and/or Lidar) device(s). The touch control stabilization computing entity 103 may receive data and/or signal output from the vehicle IMU sensor(s), display IMU sensor(s), camera(s), and/or video (and/or Lidar) device(s) and provide an input data set comprising the received data to the motion stabilization model.

In this regard, in some embodiments, the input data set may comprise motion data associated with the touch screen device, motion data associated with a vehicle in which the touch screen device 106 is located, and/or motion data associated with a user.

In some embodiments, the input data set comprises display acceleration motion data comprising one or more items of data representative and/or indicative of acceleration motion (e.g., acceleration motion measurements) of the touch screen device 106. Alternatively or additionally, in some embodiments, the input data set comprises display angular motion data comprising one or more items of data representative and/or indicative of angular motion (e.g., angular motion measurements) of the touch screen device 106. Alternatively or additionally, in some embodiments, the input data set comprises vehicle acceleration motion data comprising one or more items of data representative and/or indicative of acceleration motion (e.g., acceleration motion measurements) of a vehicle in which the touch screen device is located or associated. Alternatively or additionally, in some embodiments, the input data set comprises vehicle angular motion data (e.g., angular motion measurements) comprising one or more items of data representative and/or indicative of angular motion of the vehicle.

The touch control stabilization computing entity 103 may be configured to execute the motion stabilization model 105 (e.g., the motion stabilization algorithm thereof). In various embodiments, executing the motion stabilization model 105 (e.g., motion stabilization algorithm thereof) comprises executing a space-stabilization calculation. In various embodiments, executing a space-stabilization calculation includes determining a stable position for the touch points/widgets (considering the drift correction from the IMU(s) and the current position data), adjusting the positions of the touch zones (e.g., touch points/widgets) to align with the new positions, and reprocessing the touch detection logic to ensure accurate touch input recognition. The IMU drift correction corrects any errors or deviations that occur over time due to, for example, inherent inaccuracies of IMU sensors.

Further, the touch control stabilization computing entity 103 may be configured to normalize the touch zones by recalibrating and standardizing their dimensions and locations to maintain consistent and precise interaction points and by refining the touch processing logic to adapt to the adjusted positions and ensure seamless user interactions. Further, the touch control stabilization computing entity 103 may be configured to perform or cause performance of a scene rendering process configured to update the visual representations of the touch zones within the user interface and ensuring they are accurately displayed in their new positions. In various embodiments, the touch control stabilization computing entity 103 is configured to perform or cause performance of display processing of the adjusted and rendered touch zones to ensure that the touch zones are correctly displayed on the screen which, in turn, provides users with a stable and responsive interface that accurately reflects their touch inputs.

Additionally, the touch control stabilization computing entity 103 may be configured to execute the power optimization model (e.g., dynamic resource allocation algorithm and refresh rate control algorithm thereof). In various embodiments, executing the power optimization model (e.g., dynamic resource allocation algorithm and refresh rate control algorithm thereof) comprises performing power efficiency optimization. In various embodiments, performing power efficiency optimization comprises monitoring an activity of the touch screen device 106. In this regard, the touch control stabilization computing entity 103 may execute the dynamic resource allocation algorithm to monitor the activity of the touch screen device 106 using the input data set. That is, the touch control stabilization computing entity 103 may utilize one or more vehicle inertial measurement unit (IMU) sensors, display acceleration motion data, display angular motion data, vehicle acceleration motion data, vehicle angular motion data, and/or the like from the input data set to monitor the activity of the touch screen device 106. More particularly, in view of monitoring the activity of the touch screen device 106, the touch control stabilization computing entity 103 may classify the activity of the touch screen device 106 as one of: an active state or an idle state based on aforementioned data set. For example, if the touch screen device 106 is in use, or if the touch screen device 106 is being interacted, or if measurements associated with the data set meet predefined thresholds, an activity of the touch screen device 106 may be classified as active state. While if the touch screen device 106 is not in use, or if the touch screen device 106 is not being interacted, or if measurements associated with the data set do not meet predefined thresholds, an activity of the touch screen device 106 may be classified as idle state.

Based on such monitoring, the touch control stabilization computing entity 103 may further execute the dynamic resource allocation algorithm to allocate one or more computational resources (hardware and/or software resources, which may be, but not limited to processing power, memory, storage, and/or the like) for one or more steps or operations described herein. That is, the touch control stabilization computing entity 103 may allocate the one or more computational resources based on the activity of the touch screen device 106. For example, lesser or reduced computational resources may be allocated to the touch screen device 106 when the touch screen device 106 is in idle state when compared to computational resources allocated to the touch screen device 106 when in active state. Additionally, the touch control stabilization computing entity 103 may allocate the one or more computational resources based on one or more interaction patterns of a user with touch zones associated with the touch screen device 106 as well. Accordingly, execution of the dynamic resource allocation algorithm by the touch control stabilization computing entity 103 facilitates adaptive power management by significantly reducing overall power consumption, extending battery life while ensuring that the touch screen device 106 remains responsive and ready to use when needed.

Further, in various embodiments described herein, performing power efficiency optimization also comprises adjusting a refresh rate for a display 116 of the touch screen device 106. In this regard, the touch control stabilization computing entity 103 may execute the refresh rate control algorithm to adjust the refresh rate. More particularly, in view of adjusting the refresh rate the touch control stabilization computing entity 103 may track frequency of user interaction with the touch screen device 106. Based on the frequency of user interaction, the touch control stabilization computing entity 103 may then dynamically calculate the refresh rate. For example, when a user is actively scrolling or tapping touch zones of the display 116 that is, during high interaction periods, a higher refresh rate may be maintained for a smooth and responsive experience. While, when a user is not actively interacting with touch zones of the display 116 that is, during low interaction periods, a lower refresh rate than that of the high interaction periods may be maintained for conserving battery life without compromising usability of the display 116 of the touch screen device 106. Accordingly, execution of the refresh rate control algorithm ensures that the touch screen device 106 remains responsive and ready to use when needed, providing a seamless user experience.

In some embodiments, the functions of one or more of the illustrated components of the touch control stabilization system 102 may be performed by a single computing device or by multiple computing devices, which devices may be local or cloud based. It will be appreciated that the various functions performed by two or more of the components of the touch control stabilization system 102 may be performed by a single apparatus, subsystem, or system. For example, two or more of the components of the touch control stabilization system 102 may be embodied by a single apparatus, subsystem, or system comprising one or more sets of computing hardware (e.g., processor(s) and memory) configured to perform various functions thereof.

The various functions of the touch control stabilization system 102 and system environment 100 may be performed by other arrangements of one or more computing devices and/or computing systems without departing from the scope of the present disclosure. In some embodiments, a computing system may comprise one or more computing devices (e.g., server(s)).

The various components illustrated in the touch control stabilization system 102 and system environment 100 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMAX network. Further, a network may include a public network, such as the Internet, a private network, such as an intranet, or combinations thereof, and may utilize a variety of networking protocols now available or later developed including, but not limited to TCP/IP based networking protocols.

In various embodiments, the components depicted in FIG. 1 as being included in the touch control stabilization system 102, although not required to be an integral system, may be connected via one or more networks. In some embodiments, one or more APIs may be leveraged to communicate with and/or facilitate communication between one or more of the components illustrated in the touch control stabilization system 102 and system environment 100.

Example System Operation

As described above, in various embodiments, the touch control stabilization system 102 is configured to improve the legibility of a moving screen by appropriately positioning the touch points/touch widgets in synchronization (e.g., in sync) with a user's gaze. The system 102 is configured for stabilizing touch controls (e.g., touch points, touch widgets, touch zones) on a display system (e.g., display/screen of a user device) that eliminates incorrect and unintended touches in high motion environments. Example embodiments of the present disclosure disclose various techniques including, but not limited to, touch screen sensitivity improvement techniques, advanced algorithms for touch input filtering, and hardware enhancement techniques to ensure reliable performance under motion conditions. Example embodiments improve user experience and ensure safety when using devices while on the move or otherwise experiencing relative motion with respect to a device.

In various embodiments, the touch control stabilization system 102 improves the legibility of a moving screen by appropriately positioning the touch points/touch widgets in synchronization (e.g., in sync) with a user's gaze. In various embodiments, the touch control stabilization system 102 senses the motion of the screen and renders new positions for the touch controls which may be an inverse of the sensed motion. The touch control stabilization system 102 is configured to display the touch points on the screen (e.g., moving screen) such that the touch points are space stabilized to prevent motion and retina blur associated moving screens (e.g., moving electronic screens or the like).

In various embodiments, the motion stabilization model 105 (e.g., motion stabilization algorithm thereof) is configured to receive an input data set. The input data set may comprise input data from one or more vehicle inertial measurement unit (IMU) sensors, input data from one or more display IMU sensors, input data from one or more cameras, calculated eye gaze estimation parameters, input data from video and/or lidar sensors, and/or current graphical user interface (GUI) overlay. In various embodiments, the touch control stabilization computing entity 103 may receive the input dataset from the touch control stabilization computing entity 103. For example, the touch control stabilization computing entity 103 may be in communication with the vehicle 160, vehicle IMU sensor(s), display IMU sensor(s) (associated with the touch screen device), camera(s), and/or video (and/or Lidar) device(s). The touch control stabilization computing entity 103 may receive data and/or signal output from the vehicle IMU sensor(s), display IMU sensor(s), camera(s), and/or video (and/or Lidar) device(s) and provide an input data set comprising the received data to the motion stabilization model.

The touch control stabilization computing entity 103 may be configured to execute the motion stabilization model 105 (e.g., the motion stabilization algorithm thereof). In various embodiments, executing the motion stabilization model 105 (e.g., motion stabilization algorithm thereof) comprises executing a space-stabilization calculation. In various embodiments, executing a space-stabilization calculation includes determining a stable position for the touch points/widgets (considering the drift correction from the IMU(s) and the current position data), adjusting the positions of the touch zones to align with the new positions, and reprocessing the touch detection logic to ensure accurate touch input recognition. The IMU drift correction corrects any errors or deviations that occur over time due to, for example, inherent inaccuracies of IMU sensors.

Further, the touch control stabilization computing entity 103 may be configured to normalize the touch zones by recalibrating and standardizing their dimensions and locations to maintain consistent and precise interaction points and by refining the touch processing logic to adapt to the adjusted positions and ensure seamless user interactions. Further, the touch control stabilization computing entity 103 may be configured to perform or cause performance of a scene rendering process configured to update the visual representations of the touch zones within the user interface and ensuring they are accurately displayed in their new positions. In various embodiments, the touch control stabilization computing entity 103 is configured to perform or cause performance of display processing of the adjusted and rendered touch zones to ensure that the touch zones are correctly displayed on the screen which, in turn, provides users with a stable and responsive interface that accurately reflects their touch inputs.

Example Apparatuses of the Disclosure

Having discussed example systems in accordance with the present disclosure, example apparatuses in accordance with the present disclosure will now be described.

FIG. 2 illustrates a block diagram of an apparatus 200 in accordance with some example embodiments. In some embodiments, the touch control stabilization system 102 or one or more portions (e.g., one or more individual apparatuses) thereof, if embodied in a particular embodiment, may be embodied by one or more apparatuses 200. For example, in some embodiments, the touch control stabilization computing entity 103 and motion stabilization model 105 may be embodied by one or more apparatuses 200.

In some embodiments, the apparatus 200 may include a processing circuitry 202 as shown in FIG. 2. It should be noted, however, that the components, or elements illustrated in and described with respect to FIG. 2 below may not be mandatory and thus one or more may be omitted in certain embodiments. Additionally, some embodiments, may include further or different components or elements beyond those illustrated in and described with respect to FIG. 2. In some embodiments, the functionality of the touch control stabilization system 102, the other devices and/or systems interacting with the touch control stabilization system 102, or any subset thereof may be performed by a single apparatus 200 or multiple apparatuses 200. In some embodiments, the apparatus 200 may comprise one or a plurality of physical devices, including distributed, cloud-based, and/or local devices.

Although some components are described with respect to functional limitations, it should be understood that the particular implementations necessarily include the use of particular computing hardware, such as the hardware shown in FIG. 2. It should also be understood that certain of the components described herein may include similar or common hardware. For example, two sets of circuitries for example, may both leverage use of the same processor(s), network interface(s), storage medium(s), and/or the like, to perform their associated functions, such that duplicate hardware is not required for each set of circuitry and a single physical circuitry may be used to perform the functions of multiple circuitries described herein. The use of the term "circuitry" as used herein with respect to components of the apparatuses described herein should therefore be understood to include particular hardware configured to perform the functions associated with the particular circuitry as described herein.

In some embodiments, "circuitry" may include processing circuitry, storage media, network interfaces, input/output devices, and/or the like. In some embodiments, other elements of the apparatus 200 may provide or supplement the functionality of another particular set of circuitry. For example, the processor 206 in some embodiments provides processing functionality to any of the sets of circuitries, the memory 204 provides storage functionality to any of the sets of circuitry, the communications circuitry 210 provide network interface functionality to any of the sets of circuitry, and/or the like.

The apparatus 200 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application, and function execution, and/or other processing and management services according to one or more example embodiments. In some embodiments, the apparatus 200 or a portion(s) or component(s) thereof, such as the processing circuitry 202, may be embodied as or comprise a chip or chip set. In other words, apparatus 200 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (and/or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208) and/or a communications circuitry 210. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, and/or one or more remote or "cloud" processor(s) external to the apparatus 200.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the apparatus 200 to carry out various functions in accordance with one or more example embodiments. For example, the memory 204 may be configured to buffer input data for processing by the processor 206. Additionally or alternatively, the memory 204 may be configured to store instructions for execution by the processor 206. The memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processors 206, input/output circuitry 208 and/or communications circuitry 210, via a bus(es) for passing information among components of the apparatus 200.

The input/output circuitry 208 may provide output to the user or an intermediary device and, in some embodiments, may receive one or more indication(s) of user input. In some embodiments, the input/output circuitry 208 is in communication with processor 206 to provide such functionality. The input/output circuitry 208 may include one or more user interface(s) and/or include a display that may comprise the user interface(s) rendered as a web user interface, an application interface, and/or the like, to the display of a user device, a backend system, or the like. The input/output circuitry 208 may be in communication with the processing circuitry 202 to receive an indication of a user input at the user interface and/or to provide an audible, visual, mechanical, or other output to the user. As such, the input/output circuitry 208 may include, for example, a keyboard, a mouse, a joystick, a display, a touch screen display, a microphone, a speaker, and/or other input/output mechanisms. As such, the input/output circuitry 208 may, in some example embodiments, provide means for a user to access and interact with the apparatus 200. The processor 206 and/or input/output circuitry 208 comprising or otherwise interacting with the processor 206 may be configured to control one or more functions of one or more user interface elements through computer program instructions (e.g., software and/or firmware) stored on a memory accessible to the processor 206 (e.g., stored on memory 204, and/or the like).

The communications circuitry 210 may include one or more interface mechanisms for enabling communication with other devices and/or networks. In some cases, the communications circuitry 210 may be any means such as a device or circuitry embodied in either hardware, or a combination of hardware and software that is configured to receive and/or transmit data from/to a network and/or any other device or module in communication with the processing circuitry 202. The communications circuitry 210 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

In some embodiments, the apparatus 200 may include a touch control stabilization circuitry 212 which may include hardware components, software components, and/or a combination thereof configured to, with the processing circuitry 202, input/output circuitry 208 and/or communications circuitry 210, perform one or more functions associated with the touch control stabilization computing entity 103 (as described above with reference to FIG. 1). For example, the touch control stabilization circuitry 212 may access, facilitate access, receive process, manipulate, provide, or otherwise use, or make available for use, data used by one or more other components of the apparatus 200 through, for example, the use of applications or APIs executed using a processor, such as the processor 206. In some embodiments, the touch control stabilization circuitry 212 may interact with the memory 204, which may store the aforementioned data. It should also be appreciated that, in some embodiments, the touch control stabilization circuitry 212 may include a separate processor, specially configured field programmable gate array (FPGA), or application specific interface circuit (ASIC) to provide or otherwise facilitate access to such data used by one or more other components of the apparatus 200. The touch control stabilization circuitry 212 may also provide for communication with other components of the apparatus, system and/or external systems via a network interface provided by the communications circuitry 210.

Example Processes/Methods for Motion Stabilized Touch Control

Example embodiments provide a multi-stage touch control stabilization (e.g., motion stabilized touch control). In various embodiments, the stages of the motion stabilized touch control include scene position calculation based on an input data set (e.g., comprising vehicle IMU input, display IMU input, and/or camera input), scene render, display position calculation, display render, touch zone calculation, touch detect, touch normalization, and touch processing. In various embodiments, the output of the touch processing stage feeds into the scene render stage. In various embodiments, the display render stage and the touch zone calculation stage may be performed in parallel which is described in more details in accordance with FIG. 3A of the current disclosure.

For example, a space-stabilization calculation may be executed using a specially-configured algorithm as described above. In various embodiments, this involves determining a stable position for the touch points/widgets, considering the drift correction from the Inertial Measurement Unit (IMU) and the current position data. Once the stabilized display positions are determined, the algorithm adjusts the positions of touch zones to align with these new positions. The algorithm then reprocesses the touch detection logic to ensure accurate touch input recognition.

FIG. 3 illustrates an example flow chart depicting operations for data flow for touch control stabilization (e.g., motion stabilized touch control) in accordance with at least some embodiment discussed herein. In some example embodiments, the processes shown and described with respect to the flow chart of FIG. 3 may be generated, performed, and/or otherwise facilitated by the various systems and apparatuses shown and described with respect to FIGS. 1-2.

As depicted at block 302, the process 300 begins with determining, using a motion stabilization model, one or more stabilized positions for one or more touch points/widgets associated with the touch screen device using a motion stabilization model. A touch point or touch widget may refer to a user interface element rendered on a screen of a user and configured to cause one or more actions when a user interacts (e.g., touches) with the user interface element (see, e.g., 5A-B) on user interface In various embodiments, determining stabilized positions for the touch points/widgets comprise identify stable positions and establishing the stabilized positions as reference points for adjusting the touch zones to, for example, ensure that the user interface remains stable and reliable. In various embodiments, stabilized positions refer to positions where the display is stable and less likely to be affected by motion or other disturbances. In this regard, in some embodiments, the touch control stabilization system is configured to generate reference data for adjusting the touch zones.

At block 304, the process continues with adjusting the one or more touch zones based on the one or more stabilized positions. In some embodiments, the motion stabilization model is leveraged to adjust the one or more touch zones. In various embodiments, adjusting the touch zones comprises aligning the touch zones with the determined stabilized display positions to, for example, ensure that the one or more touch zones correspond accurately to the stable areas of the display. In various embodiments, adjusting the one or more touch zones may be dynamic in that it may accommodate changes in the stabilized positions and realign the touch zones accordingly. In some embodiments, adjusting the one or more touch zones based on the stabilized positions comprises transmitting-computer executable-instructions configured to cause the one or more touch zones to be aligned with the one or more stabilized positions;

At block 306, the process continues with reprocessing, using the motion stabilization model, the touch detection logic. In various embodiments, reprocessing the touch detection logic comprises updating one or more touch detection models to, for example, take into account the determined stabilized positioned for the touch zones. In some embodiments, a touch detection model may comprise one or more touch detection algorithms. In this regard, in some embodiments, reprocessing the touch detection logic may comprise updating one or more touch detection algorithms. In some embodiments, reprocessing the touch detection logic comprises tuning the one or more touch detection models (e.g., one or more touch detection algorithms thereof) to learn the stabilized positions. In various embodiments, reprocessing the touch detection logic ensures that the touch inputs are detected accurately, reducing the likelihood of errors or misinterpretations of user actions.

In some embodiments, the touch detection model is a data entity that describes parameters, hyper-parameters, and/or defined operations of a rules-based algorithm, machine learning model (e.g., model including at least one or more rule-based layers, one or more layers that depend on trained parameters, coefficients, and/or the like), and/or artificial intelligence model, and/or the like). In some embodiments, the touch detection model may include any type of model configured, trained, and/or the like to perform touch detect operations. In some embodiments, the touch detection model may be configured to detect touch by measuring a change in capacitance caused by a finger touching the screen. In this regard, a touch detection model may be configured to utilize one or more of any types of machine learning, rules-based, and/or artificial intelligence techniques including one or more of, supervised learning (e.g., using user feedback), unsupervised learning, semi-supervised learning, reinforcement learning, computer vision techniques, sequence modeling techniques, language processing techniques, neural network techniques, and/or generative artificial intelligence techniques. In some embodiments, touch detection model includes touch detection algorithm.

At block 308, the process continues with normalizing, using the motion stabilization model, the touch zones. In various embodiments, normalizing the touch zones comprises recalibrating one or more dimensions of the touch zones (e.g., to maintain consistency and precision) by adjusting the size and/or shape of each touch zone or at least one touch zone to ensure they are proportionate and accurately positioned, standardizing the locations of the touch zones (e.g., to ensure uniformity across the interface), and/or refining the touch processing logic adapt to the new positions and dimensions of the touch zones. In various embodiments, refining the touch processing logic comprises optimizing the algorithms that interpret touch inputs to ensure they are responsive and accurate.

At block 310, the process continues with integrating the position stabilized and normalized touch zones into the scene rendering process. In various embodiments, integrating the position stabilized and normalized touch zones into the scene rendering process comprises updating the graphical representation of the touch zones within the user interface. The scene rendering process may be configured to ensure that the touch zones are displayed accurately in their new positions, reflecting the adjustments made (as described above).

At block 312, the process continues with performing or causing performance of display processing with respect to the adjusted and rendered touch zones (e.g., to ensure that the touch zones are correctly displayed on the screen and ensure that the touch zones are stable and responsive. This, in turn, provides users with an interface that accurately reflects their touch inputs and is resilient to motion and other disturbances.

FIG. 3A illustrates an example flow chart depicting operations for parallel processing of the display render stage and the touch zone calculation stage in accordance with at least some embodiments discussed herein. In some example embodiments, the processes shown and described with respect to the flow chart of FIG. 3A may be generated, performed, and/or otherwise facilitated by the various systems and apparatuses shown and described with respect to FIGS. 1-2. As depicted at block 314, the process 300A begins with receiving input data set. The input data set may comprise input data from one or more vehicle inertial measurement unit (IMU) sensors, input data from one or more display IMU sensors, input data from one or more cameras, calculated eye gaze estimation parameters, input data from video and/or lidar sensors, and/or current graphical user interface (GUI) overlay. In some embodiments, the input data set may comprise motion data associated with the touch screen device 106, motion data associated with a vehicle in which the touch screen device 106 is located, and/or motion data associated with a user.

Also, in some embodiments, the input data set comprises display acceleration motion data comprising one or more items of data representative and/or indicative of acceleration motion (e.g., acceleration motion measurements) of the touch screen device 106. Alternatively or additionally, in some embodiments, the input data set comprises display angular motion data comprising one or more items of data representative and/or indicative of angular motion (e.g., angular motion measurements) of the touch screen device 106. Alternatively or additionally, in some embodiments, the input data set comprises vehicle acceleration motion data comprising one or more items of data representative and/or indicative of acceleration motion (e.g., acceleration motion measurements) of a vehicle in which the touch screen device is located or associated. Alternatively or additionally, in some embodiments, the input data set comprises vehicle angular motion data (e.g., angular motion measurements) comprising one or more items of data representative and/or indicative of angular motion of the vehicle.

At block 316, the process continues with scene position calculation based on the input data set. This comprises processing the input data set to determine a current scene position. Said alternatively, a position of the scene that is to be rendered via the touch screen device 106 is determined based on the processing of the input data set. At block 318, the process continues with scene rendering to render a visual scene based on the current scene position via the touch screen device 106. That is, the process 300A then comprises executing the display render stage and the touch zone calculation stage in parallel to achieve the scene rendering. In this regard, the display render stage comprises display position calculation and display render as described at blocks 320 and 322, respectively. While the touch zone calculation stage comprises touch processing, touch detect, touch normalization, and touch zone calculation as described at blocks 324, 326, 328, and 330, respectively. At block 320, the process continues with display position calculation to calculate appropriate display position(s). Based on the calculated touch zones, at block 322, the process continues with display render where visual content is rendered via the touch screen device 106 based on the calculated display position(s). It is to be appreciated that the calculation and the rendering may be done in tandem at least with touch processing as described at block 324 (that is, when a user interaction with the scene, say for triggering an action via the touch screen device 106 is processed), touch detect as described at block 326 (that is, when a user interaction with the scene via the touch screen device 106 is detected upon processing), touch normalization as described at block 328 (that is, normalizes user interaction(s) for consistent behavior across different conditions), and/or touch zone calculation as described at block 330 (that is, calculation of appropriate touch zone(s)).

By executing the display render stage and the touch zone calculation stage in parallel, responsiveness to user interactions is greatly enhanced while concurrently maintaining a stable visual output which is a crucial requirement in applications where timely interactions are imperative. Additionally, the process 300A may continue with a feedback loop (not shown) to ensure that any user interaction leads to an updated rendering of the scene, allowing real-time responsiveness. Such real-time updates boosts visual continuity, reinforcing the fidelity of user interactions with the display 116.

FIG. 4 illustrates an operation example of touchscreen sensor 400 and associated environment in accordance with at least some embodiments of the present disclosure. FIGS. 5A and 5B each illustrate an operational example of user interaction with a touch screen 500 in accordance with at least some embodiment of the present disclosure. Specifically, FIG. 5A illustrates a touch screen 500 of a user device in an initial state (e.g., non-moving state) and FIG. 5B illustrates the touch screen 500 of the user device in a state of motion. The effect of motion on a user can be seen in the FIGS. 5A-B. In particular, in the initial state illustrated in FIG. 5A, the user interacts correctly with the intended touch point/touch widget 502*a*. In the state of motion illustrated in FIG. 5B, the user can interact with an unintended touch point/touch widget 502*b* due to the effect of motion.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for motion stabilized touch control, the computer-implemented method comprising:

generating, using a motion stabilization model, reference data comprising one or more stabilized positions for one or more touch points corresponding to one or more touch zones associated with a touch screen device by applying motion data from one or more inertial measurement units to the motion stabilization model;

adjusting the one or more touch zones based on the stabilized positions by transmitting-computer executable-instructions configured to cause the one or more touch zones to be aligned with the one or more stabilized positions;

monitoring an activity of the touch screen device based at least on the motion data from the one or more inertial measurement units;

identifying one or more computational resources based on the activity of the touch screen device;

updating one or more touch detection models associated with the touch screen device by tuning the one or more touch detection models to learn the stabilized positions using the one or more computational resources;

adjusting a refresh rate for the touch screen device based on an interaction with the one or more touch zones; and recalibrating, based on the refresh rate, one or more dimensions of the one or more touch zones by adjusting a size of at least one of the one or more touch zones.

2. The computer-implemented method of claim 1, wherein recalibrating the one or more dimensions of the one or more touch zones further comprises:

adjusting a shape of the at least one of the one or more touch zones.

3. The computer-implemented method of claim 2, further comprising integrating the one or more touch zones into a scene rendering process by updating graphical representation of the one or more touch zones within a user interface of the touch screen device.

4. The computer-implemented method of claim 1, wherein the motion data comprises one or more of acceleration motion measurement for the touch screen device or angular motion measurement for the touch screen device.

5. The computer-implemented method of claim 1, wherein recalibrating one or more dimensions of the one or more touch zones further comprises standardizing the one or more dimensions for each of the one or more touch zones.

6. The computer-implemented method of claim 1, wherein the touch screen device is positioned within a vehicle.

7. The computer-implemented method of claim 1, wherein the motion stabilization model is a machine learning model.

8. An apparatus for motion stabilized touch control, the apparatus comprising at least one processor and at least one memory storing instructions that, when executed by the at least one processor, cause the apparatus to:

generate, using a motion stabilization model, reference data comprising one or more stabilized positions for one or more touch points corresponding to one or more touch zones associated with a touch screen device by applying motion data from one or more inertial measurement units to the motion stabilization model;

adjust the one or more touch zones based on the stabilized positions by transmitting-computer executable-instructions configured to cause the one or more touch zones to be aligned with the one or more stabilized positions;

monitor an activity of the touch screen device based at least on the motion data from the one or more inertial measurement units;

identify one or more computational resources based on the activity of the touch screen device;

update one or more touch detection models associated with the touch screen device by tuning the one or more touch detection models to learn the stabilized positions using the one or more computational resources;

adjust a refresh rate for the touch screen device based on an interaction with the one or more touch zones; and recalibrate, based on the refresh rate, one or more dimensions of the one or more touch zones by adjusting a size of at least one of the one or more touch zones.

9. The apparatus of claim 8, wherein recalibrating the one or more dimensions of the one or more touch zones further comprises:

adjusting a shape of the at least one of the one or more touch zones.

10. The apparatus of claim 8, wherein the apparatus is further caused to:

integrate the one or more touch zones into a scene rendering process by updating graphical representation of the one or more touch zones within a user interface of the touch screen device.

11. The apparatus of claim 8, wherein the motion data comprises one or more of acceleration motion measurement for the touch screen device or angular motion measurement for the touch screen device.

12. The apparatus of claim 8, wherein recalibrating one or more dimensions of the one or more touch zones further comprises standardizing the one or more dimensions for each of the one or more touch zones.

13. The apparatus of claim 8, wherein the touch screen device is positioned within a vehicle.

14. The apparatus of claim 8, wherein the motion stabilization model is a machine learning model.

15. One or more non-transitory computer-readable storage media for motion stabilized touch control, the one or more non-transitory computer-readable storage media including instructions that, when executed by one or more processors, cause the one or more processors to:

generate, using a motion stabilization model, reference data comprising one or more stabilized positions for one or more touch points corresponding to one or more touch zones associated with a touch screen device by applying motion data from one or more inertial measurement units to the motion stabilization model;

adjust the one or more touch zones based on the stabilized positions by transmitting-computer executable-instructions configured to cause the one or more touch zones to be aligned with the one or more stabilized positions;

monitor an activity of the touch screen device based at least on the motion data from the one or more inertial measurement units;

identify one or more computational resources based on the activity of the touch screen device;

update one or more touch detection models associated with the touch screen device by tuning the one or more touch detection models to learn the stabilized positions using the one or more computational resources;

adjust a refresh rate for the touch screen device based on an interaction with the one or more touch zones; and recalibrate, based on the refresh rate, one or more dimensions of the one or more touch zones by adjusting a size of at least one of the one or more touch zones.

16. The one or more non-transitory computer-readable storage media of claim 15, wherein recalibrating the one or more dimensions of the one or more touch zones further comprises:

adjusting a shape of the at least one of the one or more touch zones.

17. The one or more non-transitory computer-readable storage media of claim 15, wherein the one or more processors are further caused to:

integrate the one or more touch zones into a scene rendering process by updating graphical representation of the one or more touch zones within a user interface of the touch screen device, wherein the scene rendering process comprises:

executing a display render stage and a touch zone calculation stage in parallel, and wherein the display render stage comprises:

calculating one or more display positions for the touch screen device; and rendering visual content based on the one or more display positions for the touch screen device;

and wherein the touch zone calculation stage comprises:

processing an interaction of a user with the touch screen device;

detecting the interaction with the touch screen device from the user;

normalizing at least one user interaction for the user; and calculating at least one touch zone for the user to interact with the touch screen device.

18. The one or more non-transitory computer-readable storage media of claim 15, wherein the motion data comprises one or more of acceleration motion measurement for the touch screen device or angular motion measurement for the touch screen device.

19. The one or more non-transitory computer-readable storage media of claim 15, wherein recalibrating one or more dimensions of the one or more touch zones further comprises standardizing the one or more dimensions for each of the one or more touch zones.

20. The one or more non-transitory computer-readable storage media of claim 15, wherein the touch screen device is positioned within a vehicle.

* * * * *